US009169012B2

(12) United States Patent
Corrigan et al.

(10) Patent No.: US 9,169,012 B2
(45) Date of Patent: Oct. 27, 2015

(54) COAXIAL COUNTER-ROTATING ROTOR SYSTEM

(75) Inventors: John Corrigan, Coppell, TX (US); Frank Bradley Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 693 days.

(21) Appl. No.: 13/401,110

(22) Filed: Feb. 21, 2012

(65) Prior Publication Data
US 2013/0214087 A1 Aug. 22, 2013

(51) Int. Cl.
*B64C 27/08* (2006.01)
*B64C 27/52* (2006.01)
*B64C 27/10* (2006.01)

(52) U.S. Cl.
CPC .............. *B64C 27/52* (2013.01); *B64C 27/10* (2013.01)

(58) Field of Classification Search
CPC ........ B64C 27/04; B64C 27/12; B64C 27/10; B64C 27/08; B64C 27/14; B64C 27/58
USPC ............. 244/17.13, 17.11, 17.21, 17.23, 7 A, 244/12.3, 60; 416/170 R
See application file for complete search history.

(56) References Cited

U.S. PATENT DOCUMENTS

| 3,188,884 | A | * | 6/1965 | Bancroft | 74/665 K |
| 3,554,467 | A | * | 1/1971 | Yowell | 244/17.19 |
| 6,886,777 | B2 | * | 5/2005 | Rock | 244/17.23 |
| 7,137,591 | B2 | * | 11/2006 | Carter et al. | 244/17.27 |
| 7,229,251 | B2 | * | 6/2007 | Bertolotti et al. | 416/33 |
| 8,167,233 | B2 | * | 5/2012 | Brody et al. | 244/17.21 |
| 2004/0007645 | A1 | | 1/2004 | Carson | |
| 2009/0159740 | A1 | * | 6/2009 | Brody et al. | 244/17.21 |
| 2010/0001120 | A1 | | 1/2010 | Sun | |

FOREIGN PATENT DOCUMENTS

GB 2436258 A 9/2007
GB 2436258 * 12/2009 ............. B64C 27/52

OTHER PUBLICATIONS

CA Office Action dated Apr. 28, 2014 from counterpart CA App. No. 2,805,485.
Examination Report dated Sep. 9, 2014 from counterpart EP App. No. 12161915.9.
Office Action dated Mar. 5, 2015 from counterpart CA App. No. 2,805,485.

* cited by examiner

*Primary Examiner* — Tien Dinh
*Assistant Examiner* — Assres H Woldemaryam
(74) *Attorney, Agent, or Firm* — James E. Walton

(57) ABSTRACT

A system and method to tilt coaxial counter-rotating rotor hub assemblies relative to a fuselage. The system includes a first rotor hub assembly and a second rotor hub assembly spaced apart from the first hub assembly and carried by the fuselage. The method includes pivotally attaching the first rotor hub assembly and the second rotor hub assembly to a pivot joint and thereafter tilting the first rotor hub assembly and the second rotor hub assembly about the pivot joint with a driver.

13 Claims, 3 Drawing Sheets

COAXIAL COUNTER-ROTATING ROTOR SYSTEM

BACKGROUND

1. Field of the Invention

The present application relates generally to aircraft rotor systems, and more specifically, to a helicopter rotor system having coaxial counter-rotating blades.

2. Description of Related Art

Rotor systems are well known in the art, and in some embodiments, utilize two or more coaxial counter-rotating rotor blades to create flight. These known embodiments maximize the available airflow for enhancing flight characteristics, for example, increasing lifting capacity and flight maneuverability.

U.S. Pat. No. 7,229,251 to Bertolotti et al. discloses a rotor system of the type described above and is generally indicative of a current state-of-the art coaxial counter-rotating rotor system. The Bertolotti et al. rotor system includes two rotor hub assemblies coaxially aligned and configured to rotate a plurality of rotor blades in an opposing direction relative to each other. It should be understood that the Bertolotti et al. rotor system is not configured to pivot relative to the aircraft fuselage.

Although the foregoing developments represent great strides in the area of rotor systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
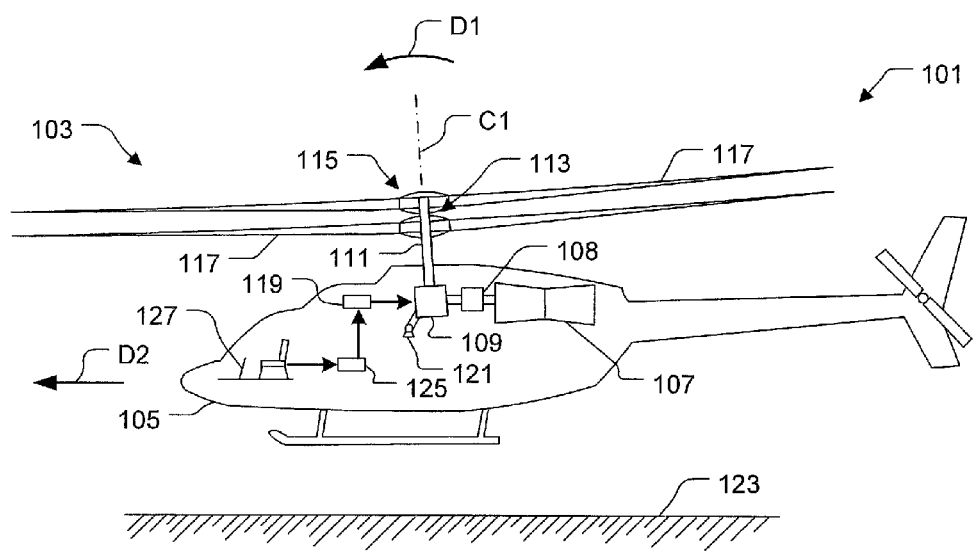
FIGS. 1A and 1B are side views of a helicopter utilizing a rotary system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcomes common disadvantages associated with conventional coaxial counter-rotating rotor systems. Specifically, the rotor system of the present application includes means for tilting the rotor hub assemblies relative to the fuselage. This feature allows the fuselage to remain in the direction of flight while the hub assemblies tilt. Further detailed description of these features are provided below and illustration in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 1B:
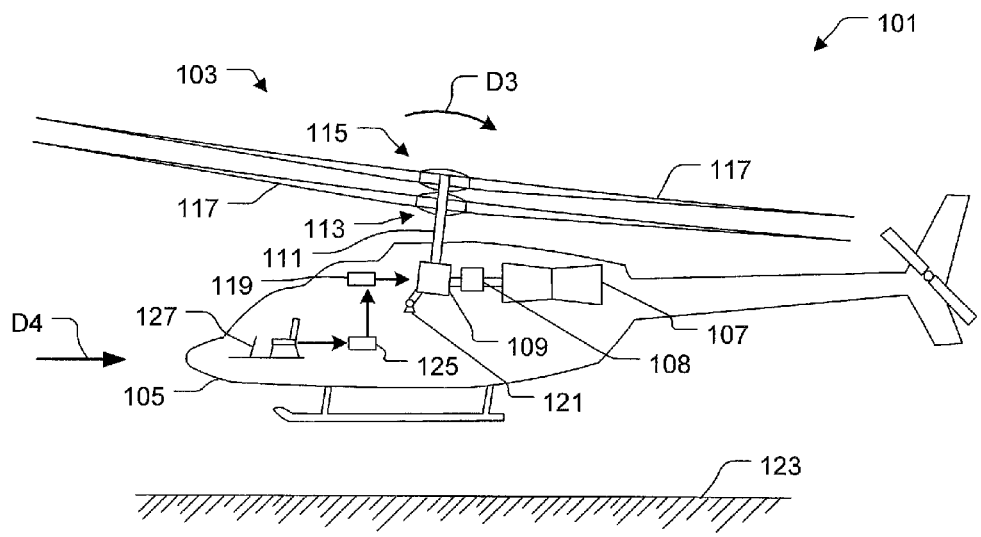

Referring now to the drawings wherein like reference characters identify corresponding or similar elements throughout the several views, FIGS. 1A and 1B illustrate a helicopter 101 having a coaxial counter-rotating rotor system 103 according to the preferred embodiment of the present application. Although a particular helicopter configuration is illustrated in the exemplary embodiment, other types of helicopters will also benefit from the present disclosure, including, but not limited to, autonomous or remotely piloted unmanned aerial vehicles.

For ease of description, not all of the required subsystems and devices operably associated with system 103 are shown in the drawings or discussed below. For example, the necessary drivers, controllers, power sources, mounting supports, circuitry, software, control systems, and so forth are not all discussed and illustrated in order to clearly depict the novel features of the rotor system. However, it should be understood that the embodiments disclosed herein are contemplated having these and other required systems and devices, as conventionally known in the art, although not fully discussed and illustrated in the drawings.

Helicopter 101 includes a fuselage 105 for carrying the various components of system 103 and device operably associated therewith. Carried within the fuselage 105 is an engine 107 for driving rotor system 103. A transmission 109 is rotatably engaged with engine 107 and is utilized to transfer rotational driving movement from engine 107 to rotor system 103. Helicopter 101 is further optionally provided with a sub-transmission 108 operably associated with engine 107 and transmission 109. In this contemplated embodiment, sub-transmission 108 could provide a reduction in input rotational speed from engine 107 to transmission 109, while transmission 109 tilts the hub assemblies relative to the fuselage. A rotor mast 111 rotatable engages with transmission 109 and attaches to the hub assemblies discussed below.

In the illustrative embodiments, rotor system 103 is provided with at least two counter-rotating rotor hub assemblies coaxially aligned about the centerline C1 of rotor mast 111.

Specifically, rotor system 103 comprises of a first hub assembly 113 positioned at a spaced relationship to a second hub assembly 115, and both hub assemblies 113 and 115 being positioned above fuselage 105 and rotatably attached to rotor mast 111. A plurality of rotor blades 117 couple to the hub assemblies 113 and 115 in any conventional manner known to one of ordinary skill in the art. In the exemplary embodiment, each hub assembly utilizes two rotor blades 117; however, it will be appreciated that any number of blades 117 may be used in alternative embodiments.

A novel feature believed characteristic of system 103 is the ability to tilt rotor system 103 relative to fuselage 105, as generally indicated with arrow D1. To achieve this feature, rotor system 103 is provided with a driver 119 operably associated with transmission 109. Helicopter 101 is further provided with a pivot joint 121 pivotally attached to transmission 109. In the contemplated embodiment, driver 119 is a hydraulic system pivotally coupled to transmission 109, wherein activation of driver 119 causes transmission 109 to pivot, resulting in hub assemblies 113 and 115 tilting relative to fuselage 105. It will be appreciated that alternative embodiments could include different driving means, e.g., a gear system, in lieu of the exemplary hydraulic system.

Rotor system 103 is further optionally provided with a control system 125 operably associated with driver 119. Control system 125 includes control laws, software algorithms, circuitry, and other hardware for either manually or autonomously controlling tilting movement of the hub assemblies during flight. In the preferred embodiment, control system 125 is operably associated with a controller 127 carried within the cockpit of fuselage 105. Controller 127 enables the pilot to tiltably adjust the hub assemblies. Other contemplated embodiments include autonomously controlling the tilting movement of the hub assemblies with the control system 125, or in the alternative, the combination of autonomously and manually controlling the tilting movement of the hub assemblies.

Figure 2A:
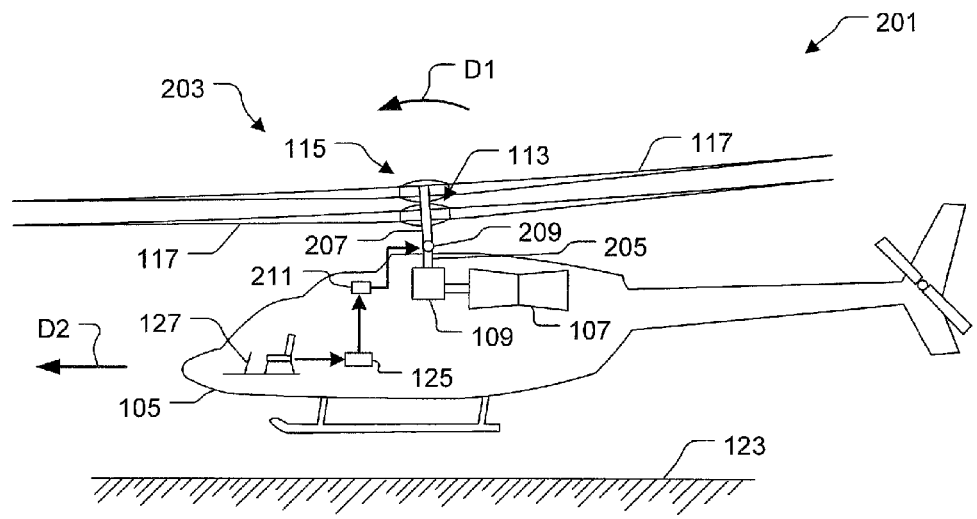
FIGS. 2A and 2B are side views of an alternative embodiment of the helicopter of FIGS. 1A and 1B.
Figure 2B:
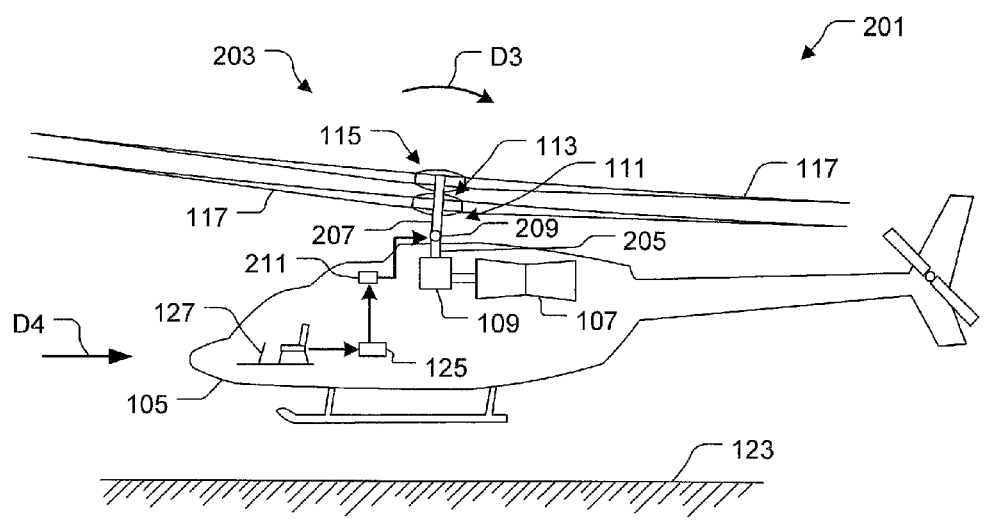

Referring next to FIG. 2 in the drawings, an alternative embodiment of helicopter 101 is shown. Helicopter 201 is substantially similar in form and function to helicopter 101 and it will be appreciated that the features of helicopter 101 are hereby incorporated in helicopter 201, and vice-versa. Also, it should be understood that like reference characters identify corresponding or similar elements are used in both embodiments.

Like helicopter 101, this embodiment also tilts the hub assemblies relative to the helicopter fuselage. Helicopter 201 is configured to achieve this feature by tilting a section of the rotor mast relative to the fuselage while the transmission remains in a relatively stationary position.

Helicopter 201 comprises a rotor system 203 having a rotor mast 111 with a first section 205 rotatably engaged with transmission 109 and pivotally attached to a second section 207 via a pivot joint 209. A driver 211 is operably associated with pivot joint 209 such that during operation, driver 211 pivots second section 207 relative to section 205, resulting in the tilting movement of rotor hub assemblies 113 and 115 relative to fuselage 105.

The operation of the helicopters 101 and 201 is now discussed, wherein the tilting movement of the rotor hub assemblies in direction D1 can result in forward flight of the aircraft, as indicated with arrow D2; and likewise, the tilting of the hub assemblies in direction D3 can result in aft flight direction, as indicated with arrow D4. In the illustrative embodiments, helicopters 101 and 201 remain flying in a direction relatively horizontal to the ground 123, as indicated with arrows D2 and D4, while the rotor assemblies tilt relative to the fuselage. Whereas, without these features, the helicopter requires both the fuselage and the hub assemblies to tilt together during flight, which can create undesired moments and other adverse forces on the helicopter.

The illustrative embodiments depict tilting movement of the hub assemblies with arrows D2 and D4; however, it is contemplated having the hub assemblies capable of tilting in any desired flight direction, resulting in tilting movement, for example, in both the forward, aft, lateral flight directions and combinations thereof.

Figure 3:
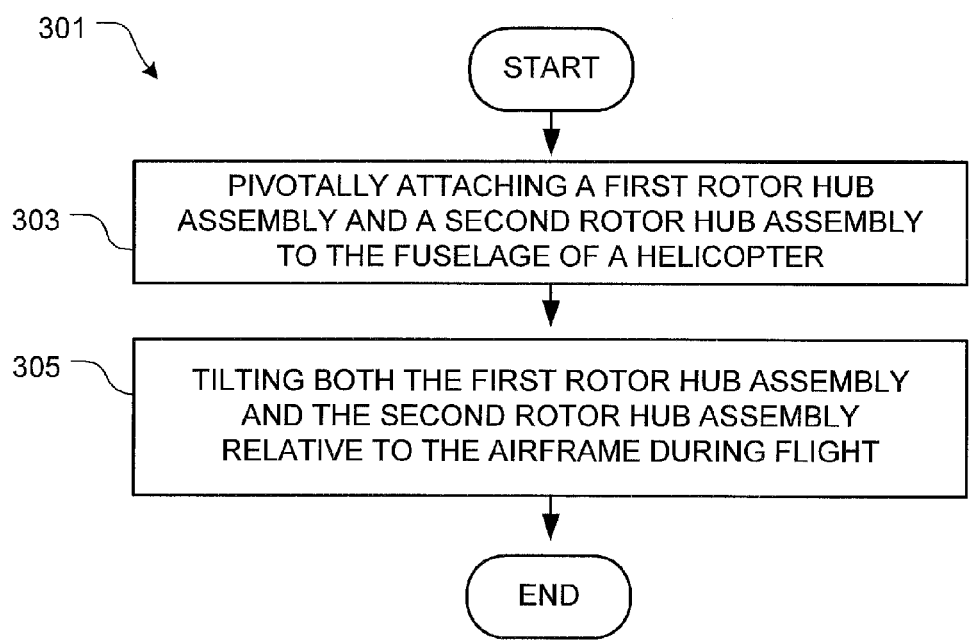
FIG. 3 is a flowchart of the preferred method.

FIG. 3 illustrates a flowchart 301 showing the preferred method, which incorporates the different embodiments of the helicopters discussed herein. The preferred method includes the process tilting the hub assemblies relative to the helicopter fuselage during flight. More specifically, box 303 depicts the first step, which includes pivotally attaching the rotor hub assemblies to the fuselage. This feature is achieved through one or more of the embodiments discussed herein, including pivotally attaching the transmission to the fuselage or pivoting a second section of the rotor mast relative to a first section of the rotor mast. Box 305 shows the additional process of commanding a driver to pivot the pivoting means about a pivot joint. An optional feature includes controlling the driver with a control system, either autonomously or manually, resulting in tilting movement of the rotor hub assemblies.

Although particular step sequences are shown, described, and claimed, it should be understood that steps may be performed in any order, separated or combined unless otherwise indicated and will still benefit from the present disclosure.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A helicopter, comprising:
   a fuselage;
   an engine carried within the fuselage;
   a transmission rotatably coupled to the engine and completely disposed within the fuselage and pivotally attached to the fuselage via a pivot joint, the transmission being configured to pivot within the fuselage; and
   a rotor system positioned above the fuselage, the rotor system having:
   a first rotor hub assembly;
   a second rotor hub assembly spaced apart from the first hub assembly;
   a plurality of rotor blades coupled to both the first hub assembly and the second hub assembly;
   a rotor mast rotatably engaged with the transmission and attached to both the first rotor hub assembly and the second rotor hub assembly; and
   a driver operably associated with the transmission;
   wherein, during flight, the engine rotates the rotor system via the transmission, while the driver pivots the transmission within the fuselage, which in turn tilts the first rotor hub assembly and the second rotor hub assembly relative to the fuselage.

2. The helicopter of claim 1, further comprising:
a control system operably associated with the driver;
wherein the control system commands the driver to pivot the transmission.

3. The helicopter of claim 2, wherein the control system autonomously commands the driver to pivot the transmission.

4. The helicopter of claim 2, further comprising:
a controller operably associated with the control system;
wherein the controller is manually manipulated, which in turn pivots the transmission via the control system.

5. The helicopter of claim 1, further comprising:
a pivot joint pivotally attached to the transmission and rigidly attached to the fuselage;
wherein the pivoting movement of the transmission occurs about the pivot joint.

6. The helicopter of claim 1, further comprising:
a sub-transmission rotatably operably associated with both the engine and the transmission;
wherein the sub-transmission reduces an input rotational speed from the engine and transfers a reduced output rotational speed to the transmission.

7. The helicopter of claim 1, wherein the driver is a hydraulic system.

8. A method to tilt a rotor system relative to a helicopter fuselage, the method comprising:
attaching a first rotor hub assembly and a second rotor hub assembly of the rotor system to a rotor mast;
rotating the rotor mast with a transmission disposed within the fuselage;
pivoting the transmission via a pivot joint disposed within the fuselage; and
tilting the first rotor hub assembly and the second rotor hub assembly as the transmission pivots.

9. The method of claim 8, wherein the process of tilting the first rotor hub assembly and the second rotor hub assembly relative to the fuselage is achieved by pivoting a transmission pivotally attached to the pivot joint and rotatably coupled to the first rotor hub assembly and the second rotor hub assembly.

10. The method of claim 8, wherein the process of tilting the first rotor hub assembly and the second rotor hub assembly relative to the fuselage is achieved by pivoting a second section of a rotor mast relative to a first section of the rotor mast;
wherein the rotor mast transfers rotational movement from an engine of the helicopter to the rotor system; and
wherein the pivot joint pivotally connects the first section to the second section.

11. The method of claim 8, further comprising:
controlling the pivoting movement of the pivot joint with a control system.

12. The method of claim 11, further comprising:
autonomously controlling the pivoting movement of the pivot joint with a control system.

13. The method of claim 8, wherein the process of tilting the first rotor hub assembly and the second rotor hub assembly is achieved through hydraulic actuation.

* * * * *